2 Sheets—Sheet 1.
J. BACHELDER.
Sewing Machine.
No. 2,125. Reissued Dec. 12, 1865.
Fig. 1,
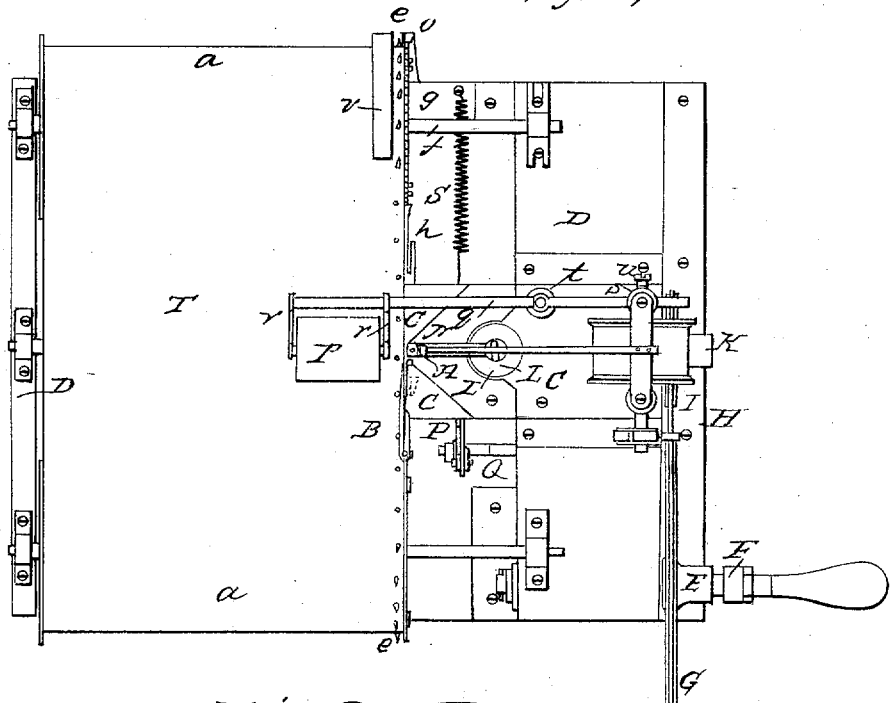
Fig. 2,
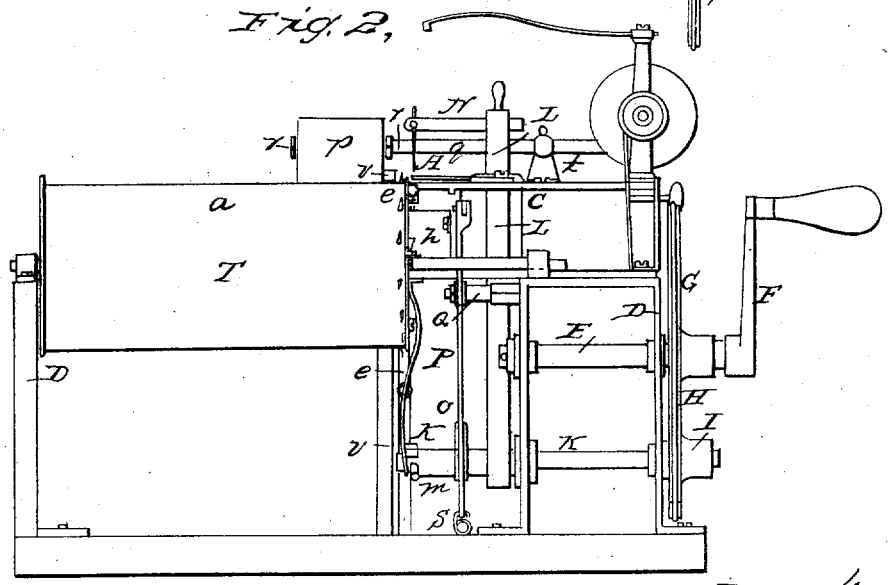
Witnesses:
Chas. Kirm Walker.
Melville Biggs
Inventor:
John Bachelder.
by his att.
E. S. Renwick.
N. PETERS, Photo-Lithographer, Washington, D. C.

2 Sheets—Sheet 2.
J. BACHELDER.
Sewing Machine.
No. 2,125. Reissued Dec. 12, 1865.
Fig. 3.
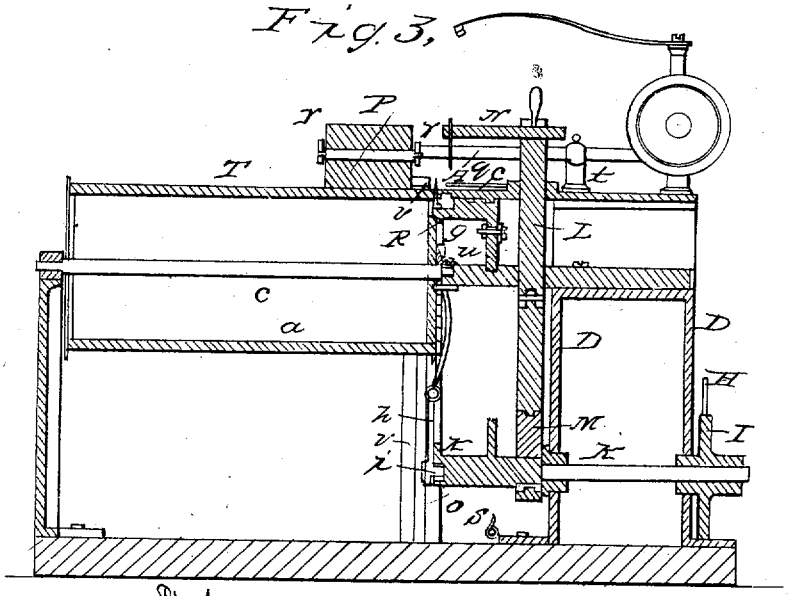
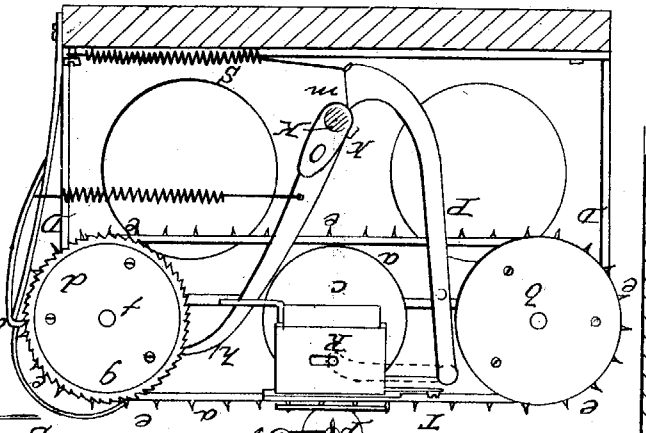
Fig. 5
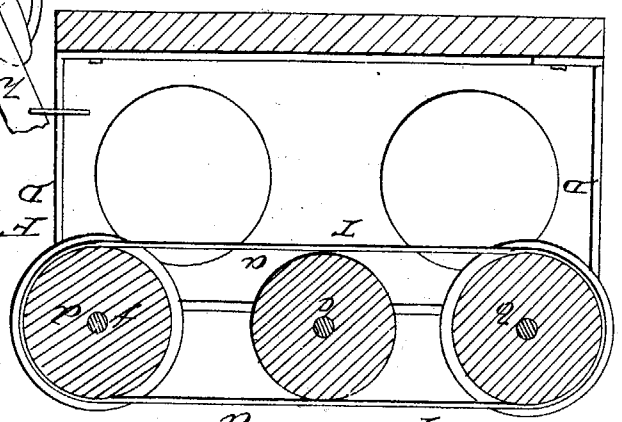
Fig. 4.
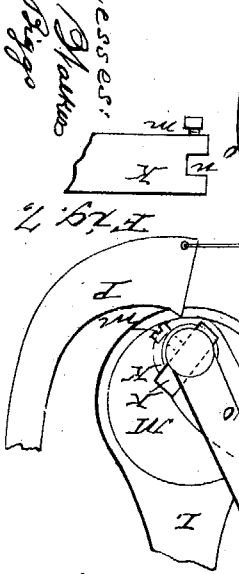
Fig. 7.
Fig. 6
Witnesses:
Chas. H. Walker
Melville Biggs
Inventor.
John Bachelder
by his att.
E. S. Renwick
N. PETERS, Photo-Lithographer, Washington, D. C.

UNITED STATES PATENT OFFICE.

JOHN BACHELDER, OF NORWICH, CONNECTICUT.

IMPROVEMENT IN SEWING-MACHINES.

Specification forming part of Letters Patent No. 6,439, dated May 8, 1849; extended seven years; Reissue No. 1,543, dated September 22, 1863; Reissue No. 2,125, dated December 12, 1865.

*To all whom it may concern:*

Be it known that I, JOHN BACHELDER, of Norwich, in the State of Connecticut, formerly of Boston, in the State of Massachusetts, have invented certain new and useful Improvements in Sewing-Machines; and I hereby declare that the following is a full, clear, and exact description thereof, reference being had to the accompanying drawings, making part of this specification.

In sewing-machines operating with an eye-pointed needle, and sewing with a continuous thread or threads known to me prior to my invention, important defects existed, which operated as serious limitations to their usefulness, and prevented their adoption to the extent their other merits demanded. In such prior machines the material to be sewed was held vertically by suspending it from points projecting from a plate technically called a "baster-plate," or in clamps, the body of the material hanging below and from such plate or clamps, and being moved through the machine or fed to the sewing mechanism while hanging in such vertical position. This method of holding and feeding the material required that it should be placed upon the points of the baster-plate or within the jaws of the clamps by an operator, who, while using his hands for this purpose, could not at the same time properly attend to the sewing. It also threw the whole weight of the material upon that part of it which was held upon the points or in the clamps. Moreover, it was not well adapted for crooked or irregularly-curved seams, and did not allow the operator conveniently to examine or inspect the stitches while the seam was being made; nor did it leave the material free to be directed by the operator conveniently during its passage to the needle while the machine was in operation, but was applicable only to such seams and parts of garments as could be thus adjusted upon and suspended from the baster-plate or in clamps, and required so much time and labor in adjusting even such seams to the plate or clamps that it was of limited utility in the branches of manufacture to which the sewing-machine was otherwise applicable or for domestic use.

The object of my invention is to hold and feed the material past the needle horizontally instead of vertically in such manner that the operator is not required to use his hands to hold the material vertically and apply it to the points or jaws of the feed, and consequently that he may inspect, guide, and give direction to the seam during the continuous action of the machine.

My invention is to be found, therefore, in the combinations of mechanisms for supporting the cloth, holding it, and moving it past the needle with a regular intermittent motion with each other, and with the sewing mechanism and other essential parts of the sewing-machine. The leading members of these combinations are—

First. A device which advances the material regularly and horizontally by an intermittent motion over and upon the horizontally-holding surface through which the needle acts, and over and upon the supporting-bed by which the material is supported, and delivers it automatically without requiring the sewing to be stopped for the purpose of attaching fresh portions of the material to the feeding instrument. This advancing device is hereinafter termed a "perpetual feed."

Second. A holding-surface upon which the material immediately about the needle rests, and is borne up horizontally under the thrust of the needle.

Third. A receiving-plate so arranged with reference to the feed as to receive and support the material in its passage from the feed.

Fourth. A yielding pressure-holder, which rests upon the upper surface of the material, near the needle, and adapts itself to the variations in the thickness of the material and holds it to the supporting-bed.

Fifth. A supporting-bed provided with a throat for the passage of the needle. This supporting-bed includes as one of its parts what is elsewhere termed in this specification the "holding-surface," and the term "supporting-bed" is to be so understood wherever it is hereinafter used. Upon this bed the material to be sewed rests and is supported against the force of gravity, the horizontality of this bed enabling it to support the material while it is in the machine.

For greater clearness and certainty, I will here state the functions and mode of operation of each of these parts.

The device termed the "perpetual feed"

takes hold of and moves forward the material horizontally and regularly by an intermittent motion upon and over the horizontally-holding surface through which the needle acts, and upon the horizontally-supporting bed, upon which the material rests, and under the yielding pressure-holder, and delivers it upon the receiving-plate, which is placed behind the feed to receive it, taking hold of a fresh portion of the material and delivering an equal portion at each stitch. This feed thus takes hold of the material, moves it forward upon the horizontal supporting-bed over the horizontally-holding surface, and delivers it perpetually upon the receiving-plate, so that any length of seam desired may be fed through and delivered during the continuous action of the machine.

Although I have used an endless apron furnished with points as my perpetual feed, I do not intend to limit myself to the use of such an apron, as a revolving circular table or a cylinder may be substituted therefor, the points being inserted in or made to project from the curved surface of either of them.

The horizontally-holding surface, upon which the material immediately about the needle is supported, is so constructed and arranged with reference to the feed and needle that it performs the office of supporting horizontally each portion of the material successively in the line of the seam against the thrust of the needle firmly in its normal and undistorted condition, so that the stitches, when set, shall be regular and uniform. Each portion of the material in which stitches are to be set throughout the line of the seam is moved by the feed stitch by stitch horizontally under the needle and over and upon this horizontally-holding surface, where it is held during the passage of the needle or while the stitch is being made.

The receiving-plate is so constructed and arranged with reference to the feed that it performs the office of receiving the material from the feeding-instrument and supporting it in its passage from the machine, thus insuring the free delivery and passage of the material from the machine during its operation in sewing a seam without entanglement with other members of the machine. The form and size of this receiving-plate are mere matters of expediency, so long as it retains and performs its functions as herein described.

The supporting-bed holds up the material by simply supporting it against the force of gravity, without requiring the attachment of the material to it, and at the same time, by its throat, permits the needle to pierce it and protrude the loop of the needle-thread through it. It so holds it up while the feed is moving it forward and the needle is piercing it, the material resting upon the bed while under the action of the needle.

The yielding-pressure holder rests upon the upper surface of the material near the needle, and holds it by a yielding pressure to the supporting-bed upon which it rests. This holder is so hung or mounted that it may be readily raised by the operator to place the material in or remove it from the machine, and it will rise and descend during the operation of the machine and accommodate itself to the varying thickness and inequalities of the material or garment being sewed, while it maintains a constant pressure upon the material throughout the whole length of the seam.

The combination of these supporting, holding, and feeding mechanisms I believe to be new. It holds and feeds the material upon a supporting bed or surface, on which it rests, of its own gravity, under convenient inspection, direction, and control of the operator, and thus saves the time and labor heretofore required in supporting or hanging up the material upon the points of a baster-plate or in clamps. It also so holds and feeds the material that seams of indefinite length may be made, and piece after piece be sewed during the continuous action of the machine, and thus saves the time and trouble heretofore required to attach the material by hand to the feed before it was sewed, and to detach it therefrom by hand after it was sewed.

The sewing mechanism with which I have combined my improvements in my machine herein represented is the same employed in the machine said to have been invented by Charles Morey and Joseph B. Johnson. It is one of the well-known sewing mechanisms to which my improvements are applicable or with which they may be used.

The mechanism by which the stitches are made forms of itself no part of my invention, and any other sewing mechanism can be employed instead of the one employed by me which parties employing my invention may prefer, so long as said sewing mechanism makes the stitches in proper time and order in combination with my improvements.

The reciprocating eye-pointed needle employed by me is well known in its functions and mode of operation, which are essentially the same in my machine as in other sewing-machines.

I have represented in the drawings other parts, which are found in previous sewing-machines, but to these I make no claim.

The drawings connected herewith exhibit the manner in which I have embodied my improvements in my machine.

Figure 1 is a top view of my machine. Fig. 2 is a front elevation of it. Fig. 3 is a vertical, central, and horizontal section of it. Fig. 4 is a transverse vertical section taken through the middle of the continuous feeding-belt. Fig. 5 is a vertical and transverse section of the machine, the same being taken through the cam, which effects the retraction of the stitch-hook, the spectator looking toward the belt.

In said drawings, A is the reciprocating eye-pointed needle; B, the hook, (see the red lines in Fig. 1;) C, the holding-surface, which holds the material under the thrust of the needle; and D is the frame-work of the machine. The holding-surface is pierced with a throat to permit the needle to pass downward. The throat is slightly larger than the needle, so that the latter can carry the thread freely through it; but it is too small to permit the passage of the material. The needle moves in a vertical plane, and descends at each stitch from above the holding-surface, carrying in its eye a loop of thread through the material and through the throat provided in the holding-surface and below such holding-surface. This needle A is attached to a bracket or needle-carrier, N, projecting from a rod, L, which is jointed at or near its center, and is forced to move up and down by an eccentric, M, mounted on a shaft, K, which is, by the aid of a belt, H, and pulleys I G, caused to revolve when the crank F on the shaft E is turned, so that the needle-carrier N has a reciprocating movement imparted to it. The rod has proper guides to insure the vertical motion of its upper part. The hook, which seizes, detains, and releases loops of thread, and operates substantially as Morey and Johnson's hook when aided by similar accessories, is represented at B as mounted on a sliding carriage, R, supported by proper ways or guides, which carriage is reciprocated by a connection with the upper end of a lever, P, pivoted at Q, and actuated by a cam, O, and spring S.

Other parts—such as stripping-plate, bobbin, tension-spring, &c.—are represented in the drawings, and are, except in position, substantially the same as in the Morey and Johnson machine, and are no part of my invention.

The perpetual feed is seen at T. It consists of a belt of leather, *a a*, supported by and running around three or any other suitable number of cylinders, *b c d*, and having a series of points, *e e e*, fixed in and projecting from its upper surface, near the needle, at such distances apart as occasion may require. This belt moves intermittently after each withdrawal of the needle through just the distance necessary to space the next stitch, which movement is produced as follows: One of the cylinders *d*, mounted on a shaft, *f*, has secured to it a ratchet-wheel, *g*, which is actuated by a pawl, *h*, driven by a crank-pin, *i*, mounted on a slide, *k*, which can be moved in a slot, *n*, on the end of the shaft K, and secured in any required position by a screw, *m*. (See Figs. 6 and 7.) By moving the slide the throw of the crank is varied, and this varies the length of the travel of the pawl, and consequently the distance through which the belt moves between each puncture of the needle, thus altering the length of the stitch. A holding-spring pawl, *o*, prevents the cylinder from moving in the wrong direction, and one of the cylinder-shafts may rest in adjustable boxes, so that it can be moved to tighten the belt. The yielding-pressure holder *p* lies upon the surface of this feed or belt. It is a roller which is heavy, free to revolve, and is so hung by links *r r* that it will approach to and recede from the belt, so as to accommodate itself to the varying thicknesses of the material and maintain a constant pressure thereon throughout the whole length of the seam. The links are pivoted upon a shaft, *q*, supported on standards *s t*, one of which is provided with a clamp-screw, *u*.

*v* is the receiving-plate, and may be of such width and size as occasion may require. It is disposed in reference to the feed as seen in the drawings. One end of this plate *v* is brought in close contact with the surface of the feed in such manner as to cause the material, when it is carried to it by the feed, to be delivered upon and over said plate and from the points and feed.

The upper surface of the belt *a a*, the holding-surface C, and the receiving-plate *v* constitute together a supporting-bed, which supports the material horizontally in the machine against the force of gravity, while permitting the passage of the needle through it, and upon this bed the material rests while the needle is acting upon it while passing through the machine and while being delivered therefrom.

In the operation of the machine the material or garment is laid upon the parts T and C, the portion where the stitch is being made resting smoothly upon the horizontally-holding surface over the throat for the passage of the needle, the portion beyond where the stitch is being made, if any, being upon the belt past the needle and upon or toward the receiving-plate, and the remainder lying in front of the needle upon the belt. The yielding-pressure holder or roller is permitted to bear upon the material or garment, holding it down to the feed and upon the supporting-bed. The hands of the operator rest upon the material or garment before the needle, directing it in its passage to the needle. By observing the operation it will be seen that the feed moves the material or garment in the line of the seam regularly and intermittently stitch by stitch horizontally over and upon the holding-surface and supporting-bed, and delivers it to or upon the receiving and supporting plate, taking hold of a fresh portion and feeding and delivering an equal portion at each stitch automatically; that the holding-surface holds or bears up each successive portion of the material throughout the length of the seam firmly in its normal or undistorted condition against the thrust of the needle as the same is moved over it by the feed; that the receiving-plate receives the material from the feed and supports it when discharged, preventing it from being entangled in the machine, and insuring its free delivery during the operation of the machine as fast as sewed; that the yielding-pressure holder bears upon the upper surface of the material near the needle and maintains a constant yielding pressure thereon throughout the whole length of the seam, holding it to the bed on which it rests and to the feed, and rising and descending to accommodate itself to all the cross-seams, inequalities, and varying thicknesses of the material; that the material rests during its entire passage through the machine and delivery therefrom of its own weight upon a supporting-bed, as cloth rests upon a table, under the control and convenient inspection of the operator; and that seams of indefinite length, or piece after piece, can be fed through, sewed, and discharged perpetually during the continuous, uninterrupted, progressive action of the machine.

Having thus described my improvements, I state my claims as follows:

1. In combination, the supporting-bed, which supports the material horizontally in the machine, and is provided with a throat for the passage of the needle, and the constant yielding-pressure holder, each having the functions and mode of operation hereinbefore specified.

2. In combination, the supporting-bed, the constant yielding-pressure holder, and the reciprocating eye-pointed needle, each having the functions and mode of operation hereinbefore specified.

3. In combination, the supporting-bed, the constant yielding-pressure holder, and the reciprocating needle-carrier, each having the functions and mode of operation hereinbefore specified.

4. In combination, the supporting-bed, the yielding-pressure holder, the reciprocating eye-pointed needle, and the perpetual feed which moves the material horizontally under and past the needle while it is supported by the supporting-bed, each having the functions and mode of operation hereinbefore specified.

5. In combination, the supporting-bed, the yielding-pressure holder, the reciprocating needle-carrier, and the perpetual feed which moves the material horizontally upon and over the supporting-bed, each having the functions and mode of operation hereinbefore specified.

6. In combination, the holding-surface which supports the material immediately about the needle horizontally under the thrust of the needle, and the perpetual feed which moves the material horizontally under and past the needle upon and over such holding-surface, each having the functions and mode of operation hereinbefore specified.

7. In combination, the holding-surface which supports the material immediately about the needle horizontally under the thrust of the needle, the perpetual feed which moves the material horizontally under and past the needle upon and over such holding-surface, and the receiving-plate which receives the material from the feed during the operation of the machine in sewing a seam, each having the functions and mode of operation hereinbefore specified.

8. In combination, the horizontally-holding surface immediately about the needle, the perpetual feed, the receiving-plate, and the yielding-pressure holder, each having the functions and mode of operation hereinbefore specified.

9. In combination, the horizontally-holding surface immediately about the needle, the perpetual feed, and the yielding-pressure holder, each having the functions and mode of operation hereinbefore specified.

10. In combination, the horizontally-holding surface immediately about the needle, the perpetual feed, the yielding-pressure holder, and a reciprocating eye-pointed needle, each having the functions and mode of operation hereinbefore specified.

11. In combination, the horizontally-holding surface immediately about the needle, the perpetual feed, the yielding-pressure holder, and the reciprocating needle-carrier, each having the functions and mode of operation hereinbefore specified.

12. In combination, the receiving-plate and the perpetual feed, each having the functions and mode of operation hereinbefore specified.

13. In combination, the horizontally-holding surface immediately about the needle, the perpetual feed, and the reciprocating needle-carrier, each having the functions and mode of operation hereinbefore specified.

14. In combination, the perpetual feed, the receiving-plate, and the yielding-pressure holder, each having the functions and mode of operation hereinbefore specified.

In testimony whereof I have hereunto set my hand this 12th day of October, A. D. 1865.

JOHN BACHELDER.

Witnesses:

CHAS. KIM. WALKER,
CHAS. H. LEONARD.